Jan. 26, 1943.  W. W. COREY  2,309,238
VALVE STEM OR VALVE OPERATING DEVICE FOR FIRE HYDRANTS
Filed April 11, 1942  2 Sheets-Sheet 1

INVENTOR:
WILLIAM W. COREY
BY Wells L. Church.
ATTORNEY

Jan. 26, 1943. W. W. COREY 2,309,238
VALVE STEM OR VALVE OPERATING DEVICE FOR FIRE HYDRANTS
Filed April 11, 1942 2 Sheets-Sheet 2
FIG. 7.
FIG. 8.
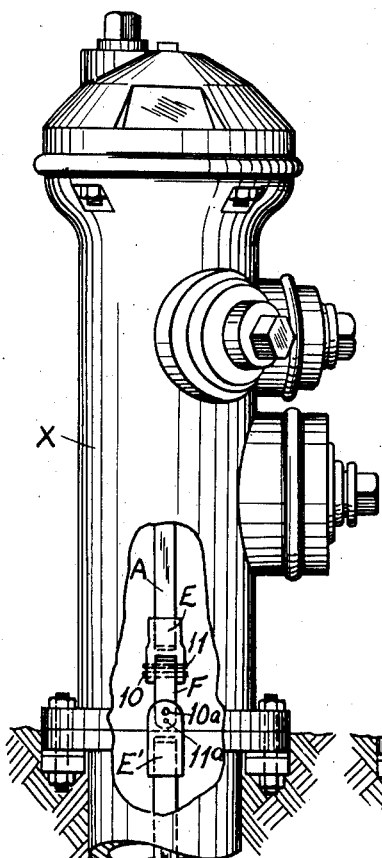
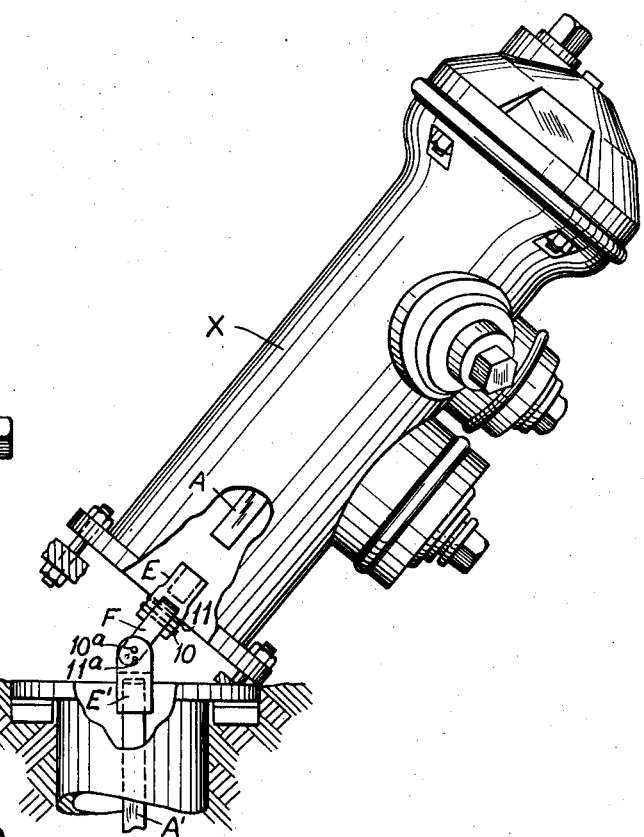
FIG. 10. FIG. 9.
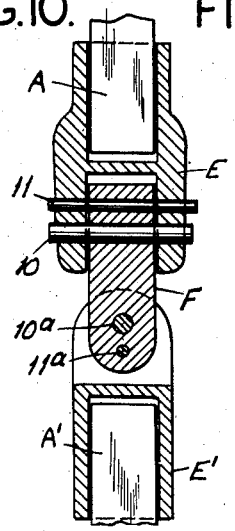
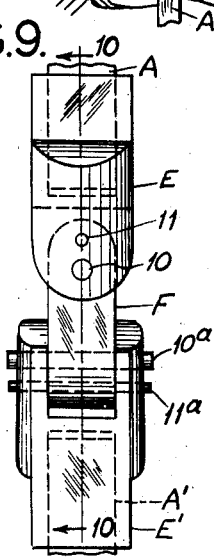
INVENTOR:
WILLIAM W. COREY
BY *Wells L. Church*
ATTORNEY Patented Jan. 26, 1943

2,309,238

UNITED STATES PATENT OFFICE 2,309,238

VALVE STEM OR VALVE OPERATING DEVICE FOR FIRE HYDRANTS

William W. Corey, St. Louis, Mo., assignor to Iowa Valve Company, Des Moines, Iowa, a corporation of Iowa Application April 11, 1942, Serial No. 438,652

12 Claims. (Cl. 287—99)

This invention relates to fire hydrant valve stems of the general type, that comprises two longitudinally-aligned sections joined or connected in such a manner that in the event the nozzle housing or upper portion of the hydrant located above the ground line, is knocked over or broken away from its supporting structure by a blow from a passing vehicle, the top section of the valve stem positioned inside of said nozzle housing, can move with the same, without causing damage or injury to the bottom section of the stem that is attached to the control valve of the hydrant.

The conventional way of constructing fire hydrant valve stems of the general type above referred to is to join the top and bottom sections of the stem together by a frangible coupling that holds said sections in rigid longitudinal alignment with each other and transmits the rotary movement of the top section to the bottom section when the stem is turned to adjust the control valve. This, of necessity, requires the use of a frangible means that is of substantial weight and size, and which usually is of complicated design.

One object of my invention is to reduce the cost and simplify the construction of fire hydrant valve stems of the general type mentioned.

Another object is to provide a fire hydrant valve stem that has all of the desirable features and characteristics of conventional fire hydrant valve stems of the type that comprises a frangible coupling for joining the two sections of the stem together, but which, in the event of injury to the nozzle housing of the hydrant, can be quickly and easily restored to its original condition.

And still another object of my invention is to provide a fire hydrant valve stem or valve operating device of the general type previously referred to, which comprises a frangible means that permits the top section of the stem to move relatively to the bottom section, in the event the nozzle housing of the hydrant is broken off by an abnormal shock or blow, and which is of such construction or design that said frangible means is not employed to transmit the rotary movement of the top section of the stem to the bottom section when the stem is turned to actuate the control valve of the hydrant.

To this end I have devised a fire hydrant valve stem or valve operating device that comprises a top section and a bottom section, and a hinged, pivoted, or articulated joint between said two sections, constructed so as to permit the top section to rock or move relatively to the bottom section forwardly, rearwardly and also laterally to the right and left, in the event the nozzle housing of the hydrant is subjected to a shock or blow of sufficient force to knock it over or break it away from its supporting structure. Preferably, the above described valve stem or valve-operating device also comprises a frangible means that normally holds the two sections of the stem in longitudinal alignment with each other and prevents the co-acting parts of the articulated joint between said sections from swinging or moving relatively to each other. If the nozzle housing of the hydrant is knocked over or broken loose from its supporting structure, the pressure which said nozzle housing exerts on the top section of the valve stem will cause said frangible means to rupture, whereupon the top section of the stem will rock or move with the nozzle housing, thereby preventing the bottom section of the valve stem from being twisted, bent or broken.

The hinged, pivoted, or articulated joint that is used to connect the two sections of the stem can be constructed in various ways, without departing from the spirit of my invention, but it is preferably so designed that the top section of the stem can swing relatively to the bottom section in four different directions, i. e., forwardly, rearwardly, laterally to the right, and laterally to the left. The frangible means that is used to normally hold the two sections of the stem in longitudinal alignment with each other, or to prevent relative swinging movement between the co-acting parts of the articulated joint between the two sections of the stem, can also be constructed in various ways, without departing from the spirit of my invention. I prefer, however, to use a frangible means consisting of small shear pins positioned in aligned holes in relatively movable portions of the structure, as such a construction permits the stem to be easily restored to its normal condition, simply by swinging the top section of the stem into longitudinal alignment with the bottom section of the stem and then substituting a new shear pin for the one that was severed by the pressure which the nozzle housing of the hydrant exerted on the top section of the stem, when said nozzle housing tilted or broke away from its supporting structure, as a result of the blow exerted on said nozzle housing. From the foregoing it will be understood that in my improved hydrant valve stem or valve operating device, the frangible means of the structure that is intended to rupture so as to prevent damage to or injury of the bottom section of the stem attached to the control valve, is not relied upon the does not function to transmit rotary movement from the top section of the stem to the bottom section, but instead, the top and bottom sections of the stem are joined together by a non-frangible means, which, in addition to permitting the top section of the stem to rock or swing relatively to the bottom section, also causes the bottom section to turn or rotate with the top section when the stem is being manipulated to change the position of the control valve of the hydrant. The frangible means of my improved structure is used simply to prevent relative swinging movement between the two sections of the stem, or, in other words, is used merely to hold the two sections of the stem in longitudinal alignment with each other. Accordingly, said frangible means can be constructed in the form of a small part of simple design, whose cost is negligible.

Figure 1 of the drawings is a fragmentary side elevational view of a fire hydrant valve stem or valve operating device, constructed in accordance with my invention.

Figure 7 is a side elevational view, partly broken away, of a fire hydrant equipped with an articulated valve stem of slightly different construction from the two other forms of my invention shown in Figures 1 and 2 and in Figures 4 to 6, respectively.

Figure 8 is a view similar to Figure 7, showing the nozzle housing broken away from its supporting structure.

Figure 9 is an enlarged side elevational view of the articulated valve stem shown in Figures 7 and 8; and Figure 10 is a longitudinal sectional view, taken on the line 10—10 of Figure 9.

Figure 1:
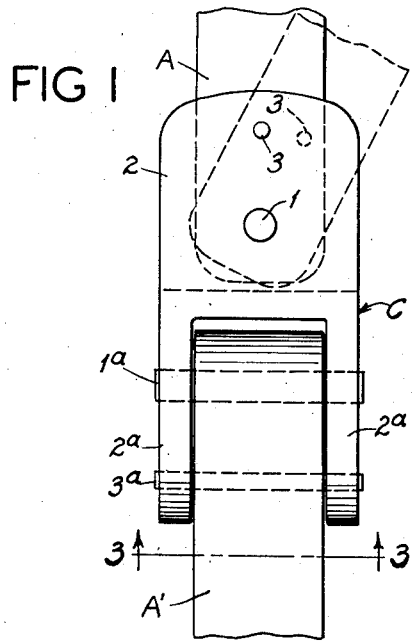
Figure 2:
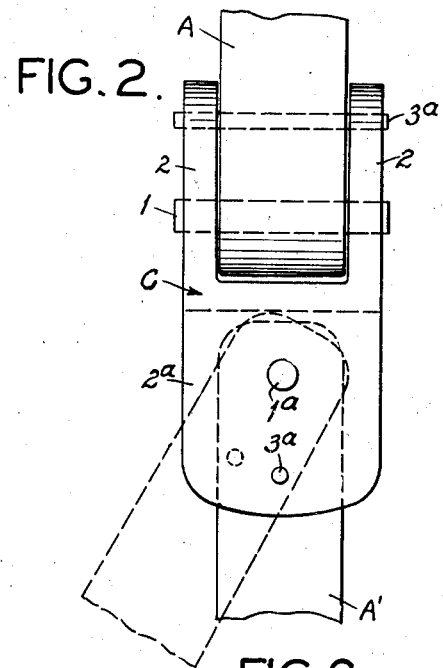
Figure 2 is a fragmentary side elevational view, taken at right angles to Figure 1.
Figure 3:
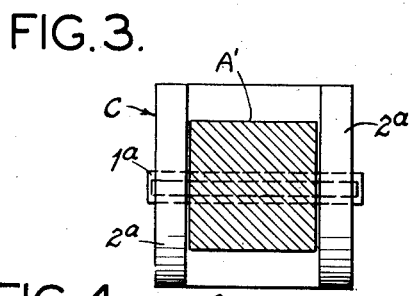
Figure 3 is a horizontal sectional view, taken on the line 3—3 of Figure 1, looking in the direction indicated by the arrows.

In the form of my invention shown in Figures 1 and 2, the top and bottom sections A and A', respectively, of my improved valve stem or valve operating device, are joined together by a hinged, pivoted, or articulated joint comprising a hinge member C and two pivots or pintles 1 and 1ᵃ that are disposed at right angles to each other. The pivot pin 1 passes transversely through the top section A of the valve stem and through a pair of spaced ears 2 on the hinge member C that embrace opposite sides of the lower end portion of said top section, and the pin 1ᵃ passes transversely through the bottom section A' of the valve stem and through a pair of spaced ears 2ᵃ on the hinge member C that embrace the opposite sides of the upper end portion of said bottom section A'. The ears 2 and 2ᵃ, which are disposed at right angles to each other, are so constructed that the top section A of the stem can swing relatively to the hinge member C, through an arc of 180°, and the hinge member C can swing relatively to the bottom section A' of the valve stem, through an arc of 180° in a vertical plane at right angles to the plane in which the top section A swings on the pivot pin 1. Consequently, the top section of the valve stem is capable of swinging or rocking in four different directions namely, forwardly, rearwardly, to the right and to the left, thereby insuring that said top section will move with the nozzle housing of the hydrant in the general direction that said nozzle housing tilts or moves in the event said housing is subjected to a shock or blow of sufficient force to knock it over or break it away from its supporting structure. The hinge member C can be conveniently formed from a metal casting comprising a horizontally-disposed center web provided with two integral sets of ears 2 and 2ᵃ, disposed at right angles to each other, and projecting upwardly and downwardly from said center web. The top and bottom sections A and A' of the stem are preferably formed from metal bars of square shape and cross section, so that the ears on the hinge member which embrace said bars will have a relatively large bearing area on same, and will effectively transmit rotary movement of the top section A of the stem to the bottom section A', without imposing shearing strains on the pivot pins or pintles 1 and 1ᵃ.

The two sections A and A' of the stem are normally maintained in longitudinal alignment with each other and in approximately rigid relationship, by small frangible devices of simple design and inexpensive construction. Due to the fact that said frangible devices are not employed to transmit rotary movement from the top section of the stem to the bottom section, when the stem is rotated to actuate the control valve of the hydrant, said frangible devices may be easily constructed so they will be sure to rupture, in the event the nozzle housing of the hydrant is knocked over or broken away from its supporting structure. In the form of my invention shown in Figures 1 and 2, the frangible means used to normally hold the two sections of the stem in longitudinal alignment with each other, consists of shear pins 3 and 3ᵃ disposed in aligned holes in the sections A and A' of the stem and in the ears 2 and 2ᵃ on the hinge member C. Thus, as shown in Figures 1 and 2, the shear pin 3, which is relied upon to normally hold the top section A of the stem against swinging movement, relatively to the hinge member C, is disposed parallel to the pivot pin 1 and is removably mounted in the top section A of the stem and in the ears 2 on the hinge member C that embrace the lower end portion of said top section. The shear pin 3ᵃ is used to normally hold the hinge member C against swinging movement relatively to the bottom section A' of the stem, and is removably mounted in said bottom section and in the ears 2ᵃ, in parallel relation to the pivot 1ᵃ. If the nozzle housing of the hydrant is knocked over or broken off, said housing will exert sufficient pressure on the top section A of the stem to cause one or the other of the shear pins 3 or 3ᵃ to rupture, depending upon the direction of the force or pressure applied to the top section A of the stem, thereby causing said top section to swing or move with the nozzle housing, without bending, twisting or straining the bottom section A' of the stem that is attached to the control valve of the hydrant. To restore the valve stem to its normal operative condition, it is only necessary to remove the severed shear pin and insert a new shear pin in the aligned holes provided for same in the two coacting parts of the structure which moved relatively to each other, due to the pressure exerted by the nozzle housing on the top section A of the stem.

Figure 6:
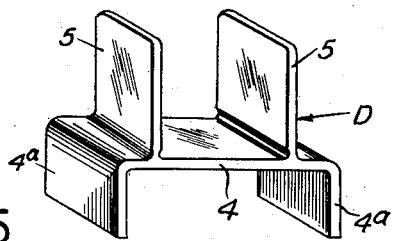
Figure 6 is a perspective view of one of the frangible devices used in the structure shown in Figures 4 and 5.
Figure 4:
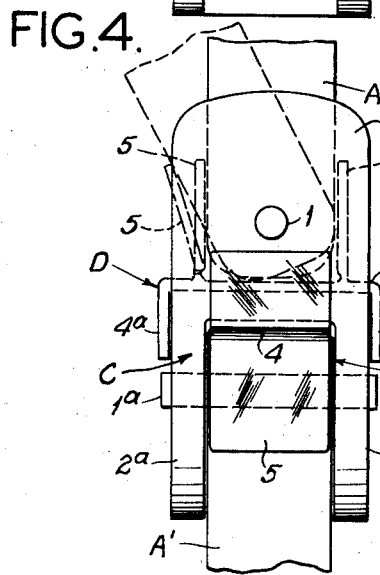
Figures 4 and 5 are fragmentary side elevational views, taken at right angles to each other, illustrating another form of my invention.
Figure 5:
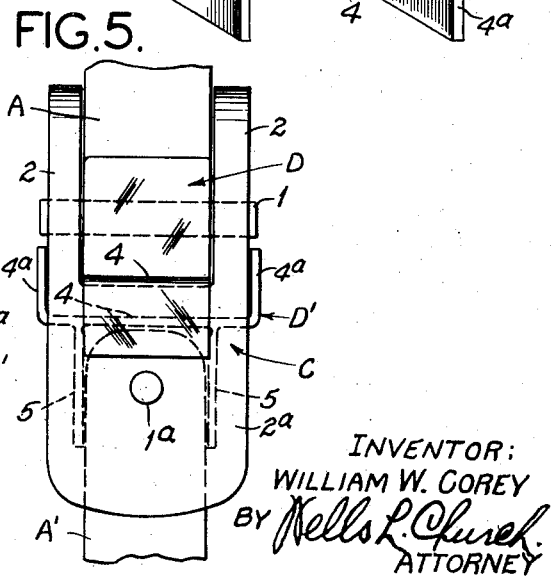

In Figures 4, 5 and 6 I have illustrated another form of my invention, wherein the frangible means used to normally prevent relative swinging movement between the hinge member C and the top and bottom sections A and A' of the valve stem, consists of two frangible elements D and D' removably combined with the hinge member C and provided with frangible portions that embrace, instead of pass through, the two sections of the stem. Said frangible elements are assembled with the hinge member C, preparatory to inserting the pivot pins 1 and 1a that attach the top and bottom sections to the hinge member, and while the particular shape or design of said frangible elements may vary, without departing from the spirit of my invention, I prefer to provide each of said elements with a base part that is interlocked with the hinge member C and which carries frangible flanges that straddle, lap over or embrace the particular section of the valve stem which said element normally holds against swinging movement. Thus, as shown in Figure 6, the frangible element D comprises a base part 4 of substantially inverted channel shape, provided with a pair of upwardly-projecting frangible flanges 5. When said base part 4 is positioned on the top side of the center web of the hinge member C, between the upwardly-projecting ears 2 on said hinge member, the upwardly-projecting ears 2 on the hinge member prevent the frangible element D from moving in two different directions, namely, forwardly and rearwardly relatively to the hinge member C, and the angularly-disposed lugs 4a at the ends of the base part of the frangible element D that straddle or project downwardly over the ends of the center web of the hinge member C, prevent the frangible element D from moving laterally, either to the right or to the left, relatively to the hinge member. After the pivot pin 1 has been inserted so as to connect the top section A of the valve stem to the ears 2 of the hinge member, the frangible flanges 5 on the base part of the element D bear against opposite sides of the top section A of the stem and prevent said section from swinging or rocking on the pivot 1. The frangible element D' is combined with the hinge member C, preparatory to inserting the pivot pin 1a, by applying the base part of said element D' to the underside of the center web of the hinge member C, between the ears 2a, so that the angularly-disposed end lugs 4a of said base part will project upwardly over the ends of the center web of the hinge member, and the frangible flanges 5 on said base part will project downwardly over opposite sides of the bottom section A' of the stem, after the pivot pin 1a has been inserted. In the event the nozzle housing of the hydrant is knocked over or broken away from its supporting structure, the pressure exerted by said housing on the top section A of the stem will cause one or the other of the flanges 5 to rupture, whereupon the top section of the stem will rock relatively to the bottom section of the stem, sufficiently to prevent the impact or pressure on the top section from being transmitted to the bottom section of the stem.

Figures 9 and 10 illustrate still another form of my invention, which differs from the two forms previously described, principally in that the articulated joint between the top and bottom sections of the stem comprises a coupling joined by two right-angularly-disposed pivot pins or pintles to hinge members having sockets that receive the adjacent ends of the top and bottom sections A and A' of the valve stem. In this form of my invention, the lower end of the top section A of the stem, which is of square shape in cross section, projects into a square socket formed in a hinge member E. The upper end of the bottom section A' of the stem, which is also of square shape in cross section, projects into a socket in a hinge member E'. The said hinge members are joined together by a coupling F that is pivotally connected to the hinge member E by a pivot pin 10, and pivotally connected to the hinge member E' by a pivot pin 10a, disposed at right angles to the pivot 10, said coupling F being preferably formed by a metal bar of square shape in cross section, whose opposite ends are positioned in bifurcated portions of the hinge members E and E'. Normally, the said hinge members and coupling F are held in substantially rigid relationship with each other by a frangible means that may be of the construction previously explained in describing the form of my invention shown in Figures 1 and 2, or the form of my invention shown in Figures 4, 5 and 6. Preferably, a shear pin 11 is arranged parallel to the pivot 10 in aligned holes in the coupling F and in the hinge member E, and a shear pin 11a is arranged parallel to the pivot 10a in aligned holes in the coupling F and in the hinge member E'. In the event the nozzle housing X of the hydrant is knocked over or broken away from its supporting structure, as shown in Figure 8, one or the other of the shear pins 11 or 11a will rupture, whereupon the top section A of the steam will rock or swing with the nozzle housing, thus preventing the impact or pressure exerted by the nozzle housing on the top section A of the stem from being transmitted to the bottom section A' that is attached to the control valve of the hydrant.

From the foregoing it will be readily understood that in my improved valve stem or valve operating device there is an articulated, hinged, or pivoted joint between the two sections of the stem that permits the top section of the stem to assume an angular position with relation to the bottom section, and which also transmits rotary movement from the top section of the stem to the bottom section when the stem is being turned to actuate the control valve of the hydrant. Normally, the two sections of the stem are held in longitudinal alignment with each other by a frangible means, but said frangible means is not relied upon to transmit rotary movement from the top section of the stem to the bottom section, when the control valve is being actuated. Hence, the frangible means of the structure may be made of such design that its cost is negligible, and it may be made weak enough so that it will be sure to rupture in the event the nozzle housing of the hydrant is broken off.

Having thus described my invention, what I claim as new and desire to secure by Letters Patent is:

1. A fire hydrant provided with a valve stem or valve operating device, comprising a plurality of longitudinally-aligned sections, and a hinged joint connecting said sections and comprising a plurality of rightangularly-disposed pivots, arranged so as to permit the top section of the stem to rock forwardly and rearwardly and also laterally to the right and left relatively to the bottom section of the stem under certain conditions.

2. A fire hydrant provided with a valve stem or valve operating device of the kind described in claim 1, in which said frangible means has provision for permitting the top section of the stem to rock forwardly and rearwardly and also laterally to the right and left, relatively to the bottom section of the stem.

3. A valve stem or valve operating device for fire hydrants, comprising a plurality of sections, a universal joint for connecting said sections together, and a frangible means for normally preventing relative swinging movement between the respective sections of the stem or valve operating device.

4. A valve stem or valve operating device, comprising a plurality of sections, a means interposed between said sections and provided with pivots disposed so as to permit the top section to rock or swing forwardly, rearwardly and laterally to the right and left, relatively to the bottom section, and a frangible means for normally holding the respective sections of the stem in longitudinal alignment with each other.

5. A valve stem or valve operating device for fire hydrants, comprising a plurality of sections, a universal coupling means between said sections provided with portions that embrace opposite side faces of the adjacent ends of said sections, and a frangible means for normally preventing relative rocking movement between said sections.

6. A valve stem or valve operating device for fire hydrants, comprising a plurality of sections, a hinged, pivoted, or articulated joint for connecting said sections together, and shear pins positioned in aligned openings in the sections of the stem and in portions of said joint for normally holding the two sections of the stem in the position they are intended to occupy when the hydrant is in a normal condition.

7. A valve stem or valve operating device for fire hydrants, comprising a plurality of longitudinally aligned sections, a hinge member interposed between the adjacent ends of said sections and pivotally attached to same by two pivots disposed at approximately right angles to each other, and a frangible means that normally holds said sections in longitudinal alignment and which, under certain conditions, is adapted to rupture, thereby permitting the top section of the stem to rock or swing relatively to the bottom section.

8. A structure of the kind described in claim 7, in which the hinge member is provided with portions that embrace opposite sides of the sections of the stem in such a way as to prevent the pivots from being subjected to destructive shearing strains when the stem is rotated.

9. A structure of the kind described in claim 7, in which the frangible means is formed by shear pins disposed parallel to said pivots and positioned in aligned holes in the sections of the stem and in portions of the hinge member that carry said pivots.

10. A valve stem or valve operating device for fire hydrants, comprising a plurality of longitudinally aligned sections, a hinge member interposed between said sections and pivotally connected to same by two pivots disposed at right angles to each other, and removable frangible elements combined with said hinge member and provided with frangible portions that embrace the two sections of the stem and maintain them in longitudinal alignment under normal conditions.

11. A valve stem or valve operating device for fire hydrants, comprising a plurality of longitudinally-aligned sections, hinge members at the adjacent ends of said sections, a coupling joined to said hinge members by pivots disposed at right angles to each other, and frangible means for normally preventing said hinge members from rocking relatively to said coupling.

12. A valve stem or valve operating device for fire hydrants, comprising a plurality of longitudinally-aligned sections, bifurcated hinge members at the adjacent ends of said sections, a coupling pivotally connected to said bifurcated members by pivots disposed at approximately right angles to each other, and shear pins disposed parallel to said pivots and arranged in aligned holes in said bifurcated members and in said coupling.

WM. W. COREY.